US006512226B1

(12) United States Patent
Loboda et al.

(10) Patent No.: US 6,512,226 B1
(45) Date of Patent: Jan. 28, 2003

(54) METHOD OF AND APPARATUS FOR SELECTIVE COLLISION-INDUCED DISSOCIATION OF IONS IN A QUADRUPOLE ION GUIDE

(75) Inventors: Alexandre V. Loboda, Winnipeg (CA); Andrei Krouttchinskikh, New York, NY (US); Victor Spicer, Winnipeg (CA); Werner Ens, Winnipeg (CA); Kenneth Standing, Winnipeg (CA)

(73) Assignee: University of Manitoba, Manitoba (CA)

( * ) Notice: Subject to any disclaimer, the term of this patent is extended or adjusted under 35 U.S.C. 154(b) by 0 days.

(21) Appl. No.: 09/555,686

(22) PCT Filed: Nov. 27, 1998

(86) PCT No.: PCT/CA98/01098

§ 371 (c)(1),
(2), (4) Date: Jun. 2, 2000

(87) PCT Pub. No.: WO99/30351

PCT Pub. Date: Jun. 17, 1999

Related U.S. Application Data

(60) Provisional application No. 60/067,045, filed on Dec. 4, 1997.

(51) Int. Cl.[7] .......................... H01J 49/42; B01D 59/44

(52) U.S. Cl. ....................... 250/292; 250/282; 250/287; 250/288; 250/423 R

(58) Field of Search ................................ 250/292, 287, 250/288, 282, 423 R

(56) References Cited

U.S. PATENT DOCUMENTS

| | | | | |
|---|---|---|---|---|
| 4,234,791 A | | 11/1980 | Enke et al. | 250/281 |
| 5,089,703 A | | 2/1992 | Schoen et al. | 250/292 |
| 5,420,425 A | | 5/1995 | Bier et al. | 250/292 |
| 5,438,195 A | * | 8/1995 | Franzen et al. | 250/292 |
| 5,448,061 A | * | 9/1995 | Wells | 250/282 |
| 5,576,540 A | | 11/1996 | Jolliffe | 250/292 |
| 5,652,427 A | | 7/1997 | Whitehouse et al. | 250/288 |
| 5,672,870 A | | 9/1997 | Flory et al. | 250/292 |
| 6,011,259 A | * | 1/2000 | Whitehouse et al. | 250/287 |

FOREIGN PATENT DOCUMENTS

| | | | |
|---|---|---|---|
| EP | 0 529 885 A | 3/1993 | H01J/49/42 |
| GB | 2 301 705 A | 12/1996 | H01J/49/42 |

* cited by examiner

*Primary Examiner*—Bruce Anderson
*Assistant Examiner*—Nikita Wells
(74) *Attorney, Agent, or Firm*—McDermott, Will & Emery; Paul Devinsky

(57) ABSTRACT

A method and apparatus are provided for selective collision-induced dissociation of a substance, by resonance excitation of ions. An ion stream is supplied into a quadrupole ion guide operated at elevated pressure with a buffer gas. In addition to a radio frequency field for guiding ions through the ion guide, an extra field or other excitation is provided. This field is selected to cause resonance excitation of parent ions of interest. These ions gain kinetic energy and undergo enhanced collision-induced dissociation with a buffer gas. This generates fragment ions, so that the resultant ion stream, containing remaining parent ions and fragment ions can be analyzed in a suitable analyzer. The method essentially enables the two steps of selection of a particular parent ion and generation of fragment ions by collision-induced dissociation to be carried out in a single step, giving a simpler apparatus and enhanced efficiency.

22 Claims, 5 Drawing Sheets

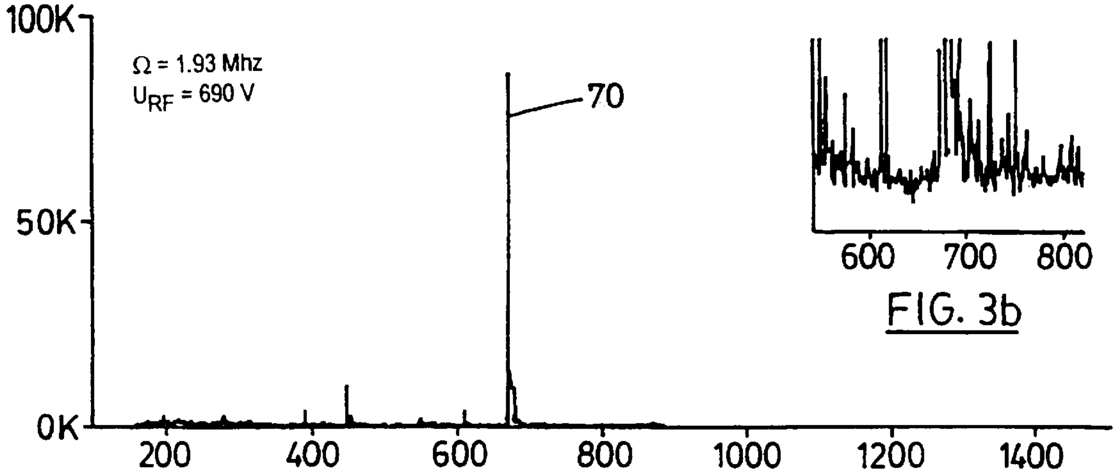
FIG. 3b
FIG. 3a
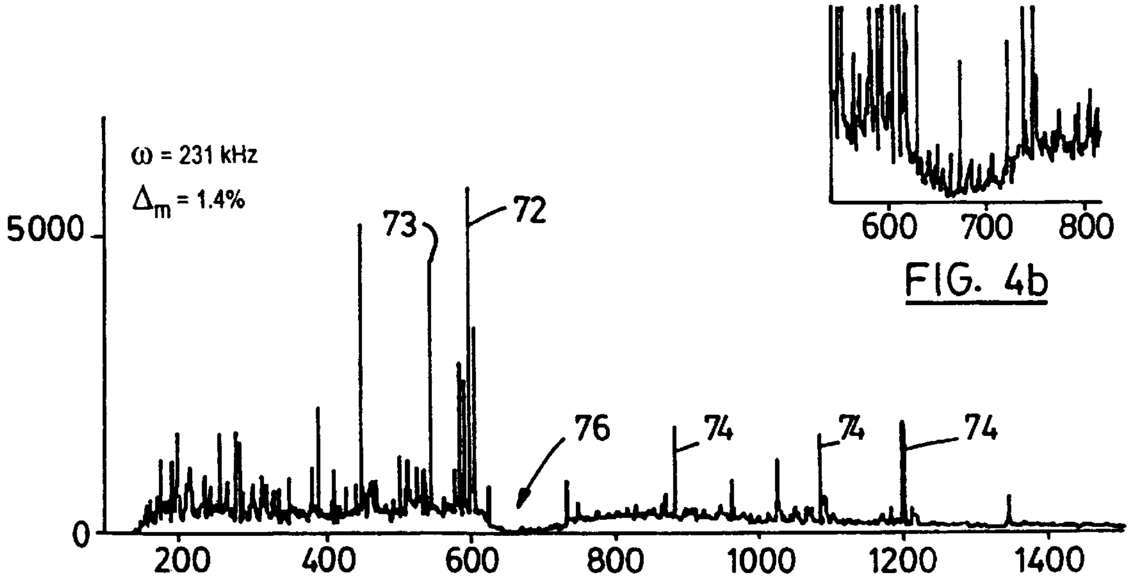
FIG. 4b
FIG. 4a

METHOD OF AND APPARATUS FOR SELECTIVE COLLISION-INDUCED DISSOCIATION OF IONS IN A QUADRUPOLE ION GUIDE

This application claims the benefit of provisional application No. 60/067,045 filed Dec. 4, 1997.

FIELD OF THE INVENTION

This invention relates to a mass spectrometer, and more particularly relates to collision-induced dissociation (CID) in a tandem mass spectrometer or in an ion guide.

BACKGROUND OF THE INVENTION

Radio frequency (RF) only multipole spectrometers, more particularly quadrupole spectrometers, are widely applied in mass spectrometry and nuclear physics, due to their ability to transport ions with minimal losses. During such transportation of the ions, the initial ion positions and velocities change, but the total phase space volume occupied by the ion beam remains constant (see Dawson, Quadrupole mass spectrometry and its applications). However, if a buffer gas is introduced into the ion guide, a dissipative process occurs, due to ion molecule collisions, and this enables an ion beam to be focused onto the quadrupole axis after the initial velocities have been damped.

Collisional quadrupole or other multipole devices have been used as an ion guide providing an interface between an ion source and a mass spectrometer, or alternatively as a collision cell for collision-induced dissociation (CID) experiments. As a straightforward interface, collisional damping reduces the space and velocity distributions of the ions leaving the ion source, thus improving the beam quality. For CID experiments, primary ions having relatively large velocities enter the multipole and collide with buffer gas molecules, so collision-induced dissociation takes place. The multipole helps to keep both primary ions and fragment ions, resulting from the collision-induced dissociation, close to the axis and to deliver them to the exit for further analysis. Collisions inside the multipole spectrometer again act to reduce the space and velocity distribution of the ion beam.

Ion motion in a perfect quadrupole field is governed by Mathieu's equation (See Dawson as cited above); ions oscillate around the quadrupole axis at an appropriate fundamental frequency which is determined by their m/z and quadrupole parameters, and is independent of ion position and velocity. If the frequency of any periodic forces acting on ions coincides with the ion fundamental frequency, then resonance excitation takes place. Similar resonance excitation is widely applied in quadrupole ion trap or in ion cyclotron resonance mass spectrometers (R. E. March, R. J. Hughes, Quadrupole storage mass spectrometry, 1989, John Wiley & Sons).

These properties of spectrometers have been employed in many ways. Thus, in U.S. provisional patent application No. 60/046,926 filed May 16, 1997, there is disclosed a high pressure MS-MS system. This was intended to provide improvements to a conventional triple quadrupole mass spectrometer arrangement, employing two precision quadrupole mass spectrometers separated by an RP-only quadrupole which is operated as a gas collision cell. The first mass spectrometer is used to select a specific ion mass-to-charge ratio (m/z), and to transmit the selected ions into the RF-only quadrupole or collision cell. In the RF-only quadrupole collision cell, some or all of the parent ions are fragmented by collisions with the background gas, commonly argon or nitrogen, at a pressure of up to several millitorr. The fragment ions, along with any unfragmented parent ions are then transmitted into the second precision-quadrupole which is operated in a mass resolving mode. Usually, the mass resolving mode of this second spectrometer is set to scan over a specified mass range, or else to transmit selected ion fragments by peak hopping, i.e. by being rapidly adjusted to select specific ion m/z ratios in sequence. The ions transmitted through this spectrometer are detected by an ion detector. A problem with this conventional arrangement is that the two mass resolving quadrupoles are required to operate in the high vacuum region (less than $10^{-5}$ torr), while the intermediate collision cell operates at a pressure up to several millitorr. That earlier invention was intended to simplify the apparatus and eliminate the necessity for separate RF-only and resolving spectrometers at the input to the apparatus. Instead, a single quadrupole is provided, operating in the RF-mode to act as a high pass filter. Additionally, this quadrupole is provided with an AC field, which can be identified as a "filtered noise field", which contains a notch in the frequency range corresponding to the mass of an ion of interest. This notch can be moved, to select and separate desired ions.

Other older proposals can be found, for example, in U.S. Pat. No. 5,420,425 (Bier et al. and assigned to Finnigan Corporation). This relates to an ion trap mass spectrometer, for analyzing ions. It has electrodes shaped to promote an enlarged ion occupied volume. A quadrupole field is provided to trap ions within a predetermined range of mass to charge ratios. Then, the quadrupole field is changed so that trapped ions with specific masses become unstable and leave the trapping chamber in a direction orthogonal to the central axis of the chamber. The ions leaving the spectrometer are detected, to provide a signal indicative of their mass-to-rations. One method that is taught in this patent is to first introduce ions within a predetermined range of mass-to-charge ratios into the chamber and subsequently change the field to select just some ions for further manipulation. The quadrupole field is then adjusted so as to be capable of trapping product ions of the remaining ions, and the remaining ions are then dissociated or reacted with a neutral gas to form those product ions. Subsequently, the quadrupole field is changed again, to remove, for detection, ions whose mass-to-charge ratios lie within the desired range, which ions are then detected.

The first technique taught above is complex, and requires a number of separate quadrupoles or the like, and the ability to move the ions sequentially through the different quadrupole sections. The technique taught in the Finnigan patent is complex and requires a number of steps. Also, it is concerned with ion traps and not a flow quadrupole. Accordingly, it is desirable to provide one technique which, in one device, readily enables ions of a selected mass-to-charge ratio to be subject to collision-induced-dissociation (CID) or fragmentation, so that the fragments can be transported further for subsequent analysis. It is desirable to provide this in a single device, since movement of ions from one device to another inevitably leads to some losses. Similarly, the techniques of the Finnigan patent work with pulse ion sources, but attempts to use them for continuous ion flow, for instance from an electrospray ion source, will lead to inefficiencies. In this field, spectrometers are frequently used to analyze small samples, and often, high efficiency is required, if any reliable reading or measurement is to be obtained.

A further proposal is found is published European patent application 0529885, to the assignee of the present invention. This discloses a multipole inlet system for ion traps. They both suggest the possibility of ejecting unwanted ions by resonant ejection, and also exciting ions by excitation at their lowest or other resonant frequencies sufficiently to cause collision-induced dissociation.

SUMMARY OF THE PRESENT INVENTION

In accordance with a first aspect of the present invention, there is provided a method of analyzing a substance, the method comprising the steps of:

(1) ionizing the substance to generate a stream of ions;

(2) supplying the stream of ions to a quadrupole ion guide;

(3) providing a buffer gas in the ion guide;

(4) applying a radio frequency field by the quadrupole ion guide to maintain desired ions in a stable trajectory through the ion guide;

(5) in addition to the radio frequency field applied in step (4), applying a periodic change to the ion guide to cause resonance excitation of ions having a selected m/z ratio whereby the selected ions acquire increased kinetic energies resulting in enhanced collision-induced dissociation with the buffer gas;

(6) applying at least one additional excitation field in the quadrupole which additional excitation field is selected to cause resonance excitation of one of an additionally selected parent ion and a fragment ion; and (7) analyzing the ion spectrum after fragmentation.

The selected ions preferably are subject to resonance excitation by one of: application of an additional field in the quadrupole, either by being applied to the existing rod set or by application to extra electrodes or rods provided for that purpose; amplitude modulation of the radio frequency field applied by the quadrupole; frequency modulation of the radio frequency field applied by the quadrupole; and periodic variation in the quadrupole radius, the resonance excitation being at a frequency different from the frequency of the radio frequency field.

With a buffer gas in a quadrupole there is an excitation threshold below which all energy acquired over one excitation period dissipates in collisions. So, the value of the threshold reflects the collision properties of the excited ions, and thus the ion cross-section and mobility could be measured.

A variant of this first aspect of the present invention also provides a method of analyzing a substance, the method comprising the steps of:

(1) ionizing the substance to generate a stream of ions;

(2) passing the stream of ions through a mass analyzer to select a parent ion;

(3) providing a quadruple ion guide and a buffer gas in the ion guide;

(4) applying a radio frequency field by the quadrupole ion guide to maintain desired ions in a stable trajectory through the ion guide;

(5) supplying the parent ions selected in the mass analyzer to the quadrupole ion guide with sufficient energy to cause collision-induced dissociation with the buffer gas and generation of primary fragment ions;

(6) in addition to the radio frequency field applied in step (4), applying a periodic change to the ion guide to cause resonance excitation of primary fragment ions having a selected m/z ratio whereby the selected primary fragment ions require increased kinetic energies resulting in enhanced collision-induced dissociation with the buffer gas to generate secondary fragment ions; and (7) analyzing the ion spectrum after fragmentation.

In accordance with another aspect of the present invention, there is provided an apparatus, for analyzing a substance by resonance excitation of selected ions and selective collision-induced dissociation, the apparatus comprising:

an ion source for generating a stream of ions;

a first quadrupole ion guide, for receiving the stream of ions and mass selecting a parent ion;

a second quadrupole ion guide, for receiving the stream of parent ions and provided with a buffer gas, for collision-induced dissociation between the parent ions and the buffer gas to generate primary fragment ions;

means for generating a radio frequency signal in the second quadrupole ion guide, for guiding ions through the second quadrupole ion guide, said generating means being connected to the second quadrupole ion guide;

means for generating an excitation signal connected to the second quadrupole ion guide for causing resonance excitation of at least one the parent ions and the primary fragment ions, thereby causing collision-induced dissociation between the parent ions and the buffer gas, generating respectively primary fragment ions from the parent ions and secondary fragment ions from the primary fragment ions; and a final mass analyzer connected to the second quadrupole ion guide, for receiving parent and fragment ions and for analyzing the ion spectrum.

A variant of this second aspect of the present invention provides an apparatus for analyzing a substance by resonance excitation of selected ions and selective collision-induced dissociation, the apparatus comprising:

an ion source for generating a stream of ions;

a quadrupole ion guide for receiving the stream of parent ions and provided with the buffer gas, for collision-induced dissociation between the ions and the buffer gas, to generate fragment ions;

means for generating a radio frequency signal in the quadrupole ion guide, for guiding ions through the quadrupole ion guide, said generating means being connected to the quadrupole ion guide;

means for generating an excitation signal connected to the quadrupole ion guide for causing resonance excitation of at least two different ions at two different frequencies, thereby causing enhanced collision-enhanced dissociation between the selected ions and the buffer gas, generating fragment ions; and a final mass analyzer connected to the quadrupole ion guide, for receiving ions and for analyzing the ion spectrum.

While it is preferred to use a quadrupole device in the present invention, it is also envisaged that the invention could be applied to a variety of multipole instruments, such as a hexapole or octopole device. In these devices, the secular frequency of an ion depends on its position, so that the mass resolution and selectivity would not be as high. However, for some applications, the selectivity available in other multipole devices might be sufficient, and hence both the method and apparatus of the present invention could be implemented using a variety of multipole devices.

BRIEF DESCRIPTION OF THE DRAWING FIGURES

For a better understanding of the present invention and to show more clearly how it may be carried into effect, reference will now be made, by way of example, to the accompanying drawings in which.

Figure 5:
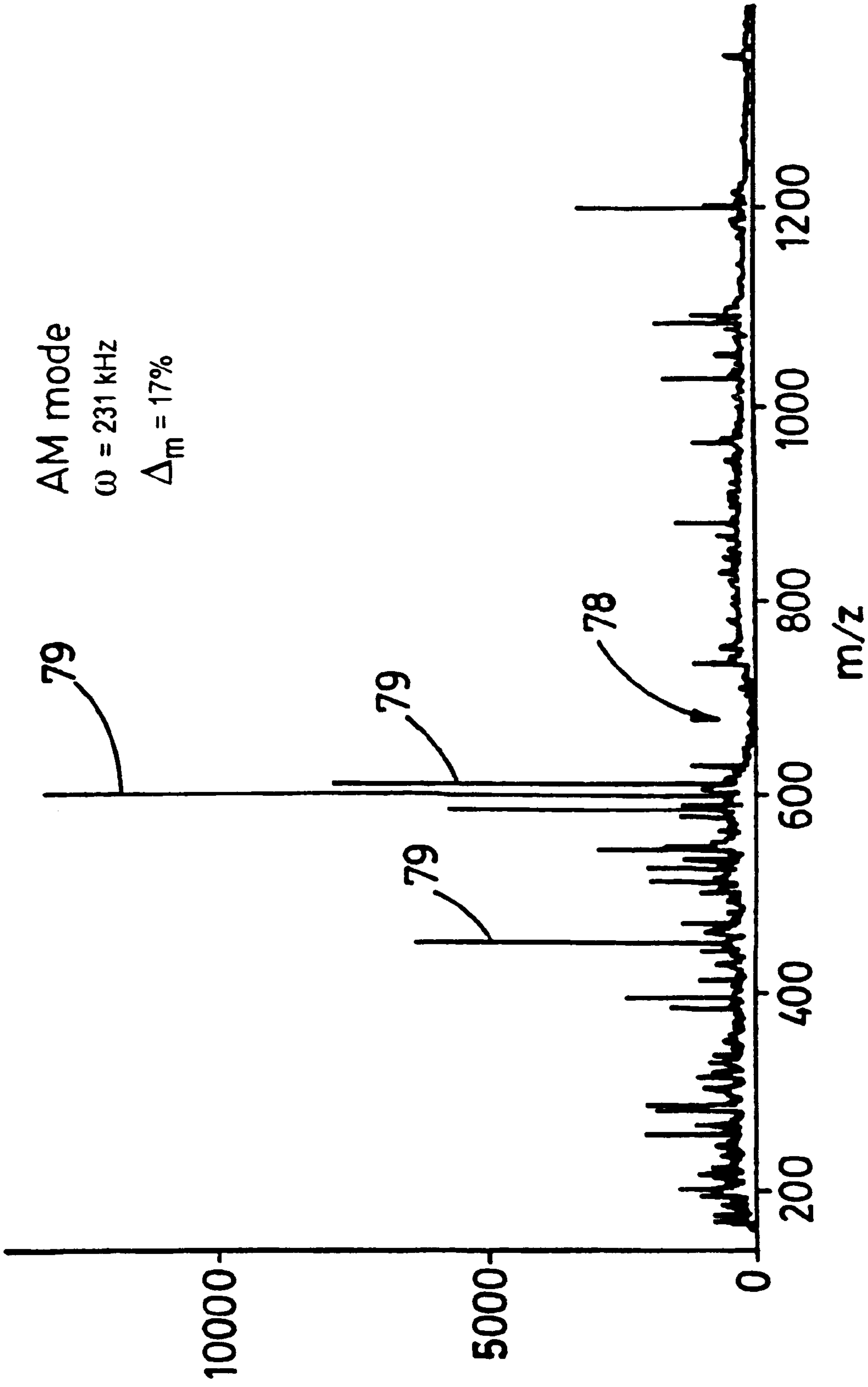
Figure 6:
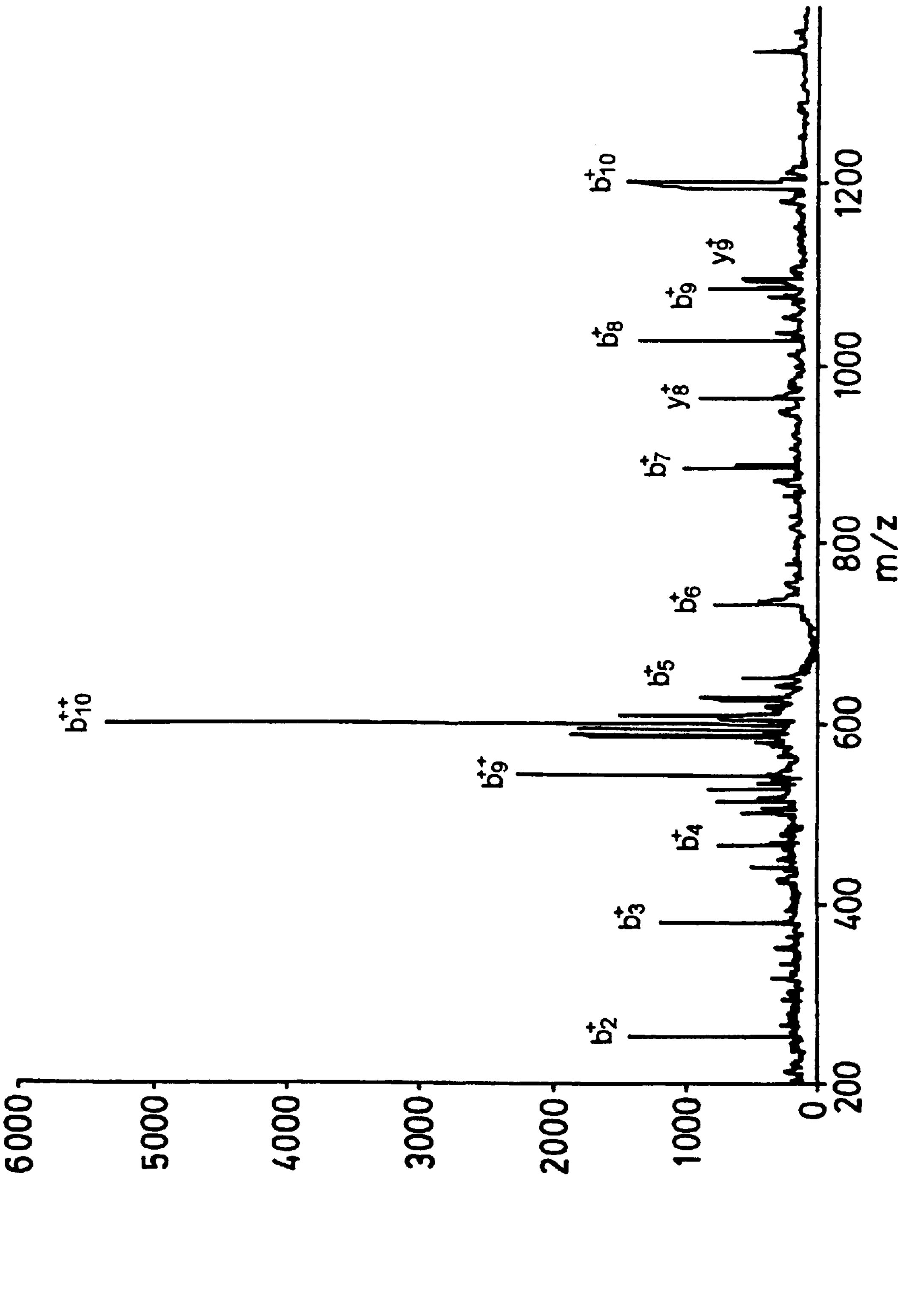

FIGS. 3*a* and 3*b* show graphs of a spectrum of ion count against mass for a sample on different scales;

FIGS. 4*a* and 4*b* show graphs of a spectrum of the same sample as for FIG. 3, after fragmentation and also on different scales;

FIG. 5 shows a graph similar to FIG. 4*a*, operating in a different mode; and FIG. 6 shows the spectrum of FIG. 4*a*, after subtraction of the spectrum of FIG. 3*a*.

DESCRIPTION OF THE PREFERRED EMBODIMENTS

Figure 1:
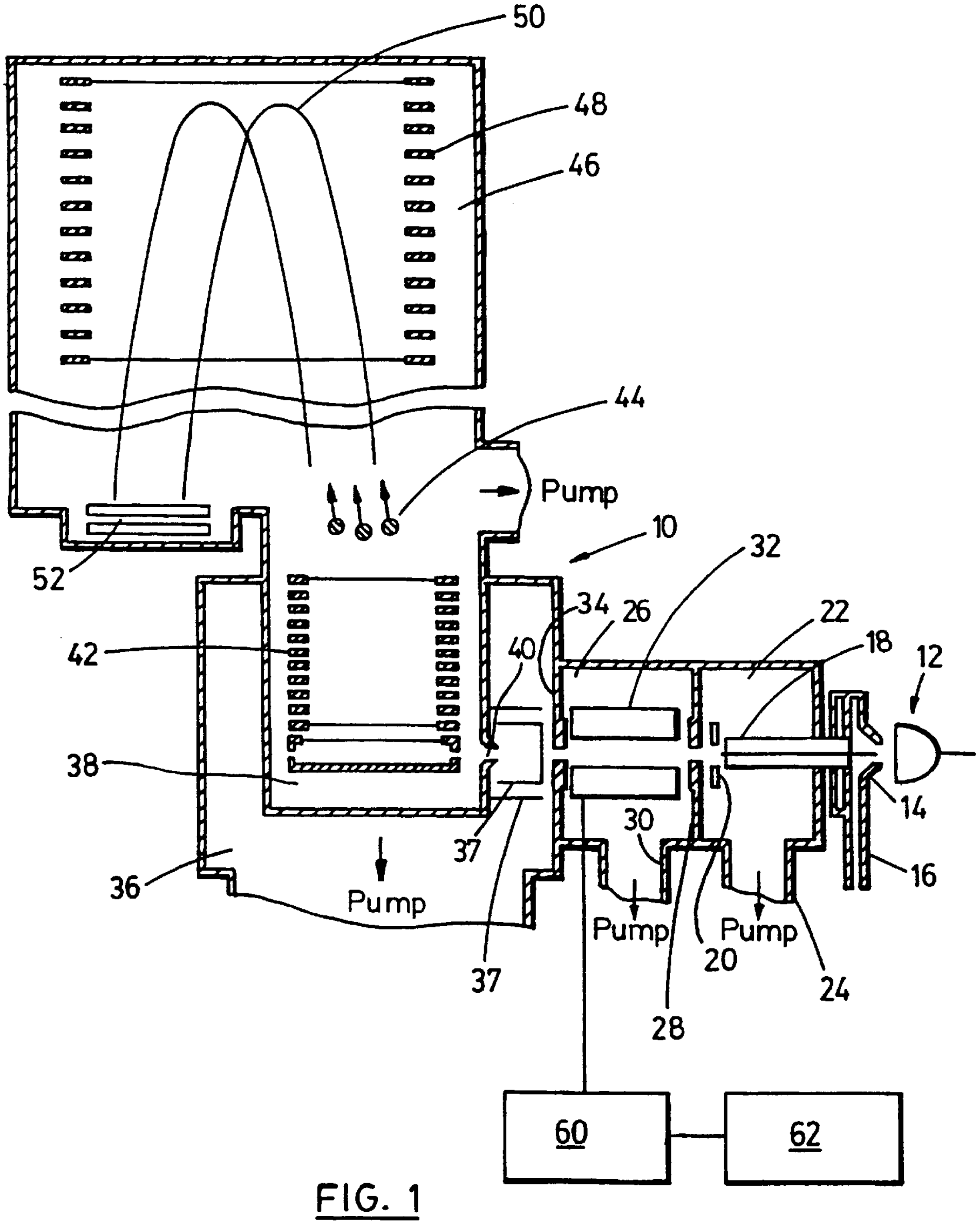
FIG. 1 shows schematically a first embodiment of an apparatus in accordance with the present invention.

FIG. 1 shows a first embodiment of an apparatus generally designated by the reference 10. The apparatus 10 includes an electrospray ion source 12. A gas curtain stage 14 is used to evaporate charged droplets by means of hot dry nitrogen 16. A heated capillary 18 introduces the gas-ion mixture to a vacuum chamber 22 which is the first stage of an interface between atmospheric pressure and high vacuum.

The chamber 22 is pumped through the line or connection 24, so the pressure in chamber 22 is usually about 2.4 Torr. A focusing electrode 20 helps to separate ions from the buffer gas and to direct these ions toward a skimmer 28. The skimmer 28 separates the first chamber 22 of the interface from the second chamber 26. A connection 30 is provided for the next pump and pressure at this stage is about 0.1 Torr. The quadrupole ion guide 32 is provided in the chamber 26 in known manner.

A third stage 36 of the interface is separated from the second stage by a wall 34 with a small orifice for ions to pass through. Grid electrodes 37 focus ions to an entrance aperture 40 of a time of flight (TOF) analyzer.

Within the TOF analyzer chamber an acceleration column 42 is located. It is constructed from an array of electrodes. In known manner, ions first fill an accumulation-extraction region, during an accumulation period, in which no potential difference is applied across electrodes at the bottom of the TOF. Then, voltage to the bottom plate is pulsed in order to extract or to drive ions into the acceleration column. The repetitive process of accumulation-extraction permits analysis of a continuous ion beam, without dramatic losses. As indicated at 44 ions after acceleration pass into the main TOF chamber 46.

An ion mirror 48 consisting of an electrode array generates a field to reverse the motion of the ions as indicated in 50, and also improves the TOF spectral quality due to the so called "time focusing effect". The ions are collected at detector 52, and their time of flight from the bottom of the acceleration column 42 to this plane is measured, to give an indication of the mass-to-charge ratio of the ions.

Now, in accordance with the present invention, the quadrupole ion guide 32 in the second chamber is operated to cause collision induced dissociation of the ions of interest. In this respect, among many multipole designs available, the quadrupole ion guide has a unique feature. Ions having stable trajectories in a perfect quadrupole field oscillate around the central axis of the quadrupole with a so-called fundamental or secular frequency determined by their m/z ratio and the parameters of the RF field applied to the quadrupole. The fundamental frequency for each ion is independent of the initial coordinates and velocity of the ion.

Now, the present inventors have realized that if an appropriate additional field oscillating at the fundamental frequency (or its multiples) is applied to the quadrupole ion guide 32, then this field can cause resonance excitation of ions with the particular m/z ratio. Such a field is given by:

$$f=f_{fund}\pm n^{*}f_{RF}(n=0,\pm1,\pm2\text{ etc})\qquad(1)$$

Alternatively, other periodic changes in quadrupole parameters, such as the RF amplitude could provide similar resonance excitation. Moreover, it is expected that excitation at several different preset frequencies could cause a number of different ions with different m/z ratios to be excited.

As a result of such excitation, the average velocity of the selected ions will be increased. Such resonance excitation is known and has been proposed for use in isotope separation, by selectively exciting the m/z of one isotope in order to cause it to be removed from the quadrupole by striking the rods, thus causing the ion beam to be enriched in the preferred isotope (Dawson, Quadrupole mass spectrometry and its application). Similar resonance excitation methods have been used for ion detection and collision-induced dissociation in a 3D (three dimensional) quadrupole ion trap.

In a 3D trap, ions are shared for a selected time period, which allows them to be excited and then fragmented after an appropriate time interval. In the present invention, ions are fragmented as they pass through the quadrupole, without trapping them. Since the ions spend only a limited time in the quadrupole, it had previously been thought that they would not have sufficient time to be excited and fragmented before reaching the end of the quadrupole, without striking the rods. Similarly, ion traps are operated at a pressure of about 1 millitorr or less of helium and this gives no indication as to whether ions could be selectively excited and caused to fragment at a pressure such as 100 mTorr, since the higher pressure acts to damp the radial ion motion. Additionally, the "resolution" (actually a window of about 100 Daltons wide, as shown in FIG. 4*a*), the high pressure, and the efficiency of fragmentation at this high pressure, could not at all have been derived from the prior art.

Also, the differences between 3D ion trap and quadrupole ion guide are in electrode configurations and in working regimes. An ion trap is a storage type of mass spectrometer; ions are first accumulated, then processed and then detected. A 3D quadrupole field in an ion trap acts in all 3 dimensions and focuses ions toward the center of the trap. A quadrupole ion guide or 2D quadrupole is usually a flow device. It provides a constant flow of ions from the entrance to the exit. A 2D field acts in 2 dimensions orthogonal to the quadrupole axis and focuses ions toward the axis of the quadrupole.

The Finnigan patent is an exception in the field of 2D quadrupoles. There, the inventors propose to use it in a storage mode closing both ends by the means of higher DC potentials applied to elements at the ends of the main quadrupole. In contrast, in the present invention the excitation method is used in the flow mode. Also the Finnigan patent proposes the use of radial ejection of the ions to be detected. The patent suggests resonance excitation and extraction through a slit in one rod of the quadrupole, which is similar to the detection methods implemented in 3D ion traps. That means the beam of extracted ions will have broad space and velocity distributions. Thus it will be hard to manage this beam, to introduce it into another analyzing device, for instance TOF or ICR mass spectrometer, and to obtain the best resolution that the latter device is capable of. In our case, extraction is in the axial direction which gives a beam of high quality that can be easily introduced into another device, the TOF mass analyzer in FIG. 1.

Here, the excited ions acquire high kinetic energies and collision-induced dissociation is more likely to take place. Resulting fragmented ions usually have m/z ratios different from the parent ions so that they are not subject to the resonance excitation. In effect, these fragment ions cool and become focused onto the axis of the quadrupole 32.

Thus, the method of the present invention enables ions to be selected for fragmentation by proper choice of the excitation frequency, i.e. selecting the ions on the basis of their m/z ratios. This is somewhat analogous to the selection of an ion in an upstream quadrupole mass filter for fragmentation in a separate collision cell. Here, the two steps of selection and collision are accomplished in a single quadrupole, without the addition of any other apparatus apart from extra signal generation or modulation equipment. As such, the apparatus should be able to provide much higher sensitivity, since there are no losses at selection and intermediate stages.

As noted above, any suitable form of excitation can be provided. More particularly, there are three preferred modes of excitation, which are described separately below: an excitation signal at its own frequency added to the quadrupole field; amplitude modulation of the main RF quadrupole field at the excitation frequency; and phase or frequency modulation of the main RF signal for the quadrupole at the excitation frequency. The provision of this additional excitation signal can be readily provided using known equipment. This is shown schematically in FIG. 1, where 60 indicates conventional equipment for providing RF and DC excitation to the quadrupole ion guide 32, and 62 indicates additional circuitry or equipment for providing the additional excitation signal required by the present invention.

Addition of an excitation signal to the conventional quadrupole RF signal is represented by the following equation:

$$U(t)=U_{RF}*\sin(\Omega*t)+U_{RF}\Delta_m*\sin(\omega*t) \quad (2)$$

where $U(t)$=quadrupole potential, $U_{RF}$=main RF wave amplitude, $\Omega$=main RF frequency, $\Delta_m$=excitation factor, $\omega$=excitation frequency.

Alternatively, for amplitude modulation the signal applied to the quadrupole ion guide is represented by the following equation:

$$U(t)=U_{RF}*\sin(\Omega*t)*(1+\Delta_{exc}*\sin(\omega*t) \quad (3)$$

where $\Delta_{exc}$=modulation factor.

Finally, for the third possibility, frequency or phase modulation of the radio frequency excitation signal is represented by the following equation:

$$U(t)=U_{RF}*\sin(\Omega*t+\Delta_{exc}*(\Omega/\omega)*\sin(\omega*t)). \quad (4)$$

Reference will now be made to FIGS. 3–6, which show spectra obtained using the method of the present invention. A peptide, substance P, was used to generate ions in the apparatus of FIG. 1. In the first test, the Rf potential was 690 volts at a frequency of 1.93 MHz, as given by the following equation:

$$U(t)=690<V>*\sin(2*\pi*1930000*t<s>). \quad (5)$$

The results are shown in FIG. 3. In the test, both doubly charged ions and singly charged ions were observed. A significant peak of doubly charged ions at m/z=674 m/z was observed as indicated at 70. This is shown in more detail in the insert FIG. 3*b,* showing, on an enlarged scale, the spectrum in the range 600–800 m/z.

The second test was run with the same peptide, and with the same base signal for the RF field. An additional component was added to this field having a potential of 9 volts and a frequency of 231 kHz, the total signal being represented by the following equation:

$$U(t)=690<V>*\sin(2*\pi*1930000*t<s>)+9<V>*\sin(2*\pi*2310000*t(s)). \quad (6)$$

As shown in FIG. 4*a,* it was found that the doubly charged ions were excited so that energetic collisions of the ions with buffer gas took place, causing ion fragmentation. The buffer gas was nitrogen. As a consequence, there is a dip in the spectrum from approximately 600 to just above 700 m/z, as best shown in the insert 4*b,* and intense peaks of the fragments were observed. Correspondingly, the fragmented ions give greater concentrations in other parts of the spectrum.

In fact, it has been found that the best results can be obtained if spectra accumulation/subtraction is done on line, i.e. spectrum with and without excitation recorded alternately. By this means, slow variations in ion intensity will not effect the resulting subtracted spectra.

To better show the effect of this excitation fragmentation, FIG. 6 shows the spectra of FIG. 4*a* with the spectra FIG. 3*a* subtracted. FIG. 6 has been marked with standard notation to show the various fragments identified in this spectrum.

FIG. 5 shows another alternative excitation regime, following equation 2 above, i.e. amplitude modulation. Again, the same voltage and frequency were used for the base RF signal, with the amplitude of the signal being subjected to sinusoidal fluctuations to a maximum of 17%, again at a frequency of 231 kHz, as given by the following equation:

$$U(t)=690<V>*\sin(2*\pi*1930000*t<s>)+(1+0.17*\sin(2*\pi*231000*t(s)) \quad (7)$$

It can be seen that the spectrum obtained in FIG. 5 is very similar to that obtained in FIG. 4*a,* although with slight variation and the distribution of the different fragments. The dip in the spectrum is shown at 78 and fragments at 79. It will be appreciated that depending upon the substance under investigation and other characteristics, an appropriate excitation regime can be selected, to give optimum results.

It has been found that the effect of excitation becomes noticeable in spectra only when a certain level of superimposed voltage is reached. This threshold is determined by the balance of excitation dissipation forces averaged over the period of the excitation frequency. As a result, the dissipation forces can be measured, giving the values of ion mobility and collisional cross-section.

It is expected that the method of the present invention, providing selective CID, will provide higher sensitivity as compared to conventional standard tandem MS-MS. In a standard MS-MS technique or experiment, the transmission of ions through the mass filter selecting the parent ion can be as low as 10%, so only a small fraction of the potentially available ion beam can possibly give rise to fragment ions. In contrast, with the technique of the present invention, all parent ions are available for fragmentation. It will be appreciated that these sorts of analysis techniques are often used in situations where only a very small amount of a sample is available. For example, in certain scientific or biological studies, only very small amounts of samples are available. These type of spectrometers are also often used in criminal investigations, concerning drugs, explosives and the like, and again often only a trace or small amount of a sample is available. Hence, it is highly desirable to have an instrument with a high sensitivity.

A further advantage is that the apparatus of the present invention only requires one mass analyzer, either a quadrupole, or a time of flight device, the latter being shown in FIG. 1, instead of the two or more mass analyzers required for standard MOMS instruments.

Figure 2:
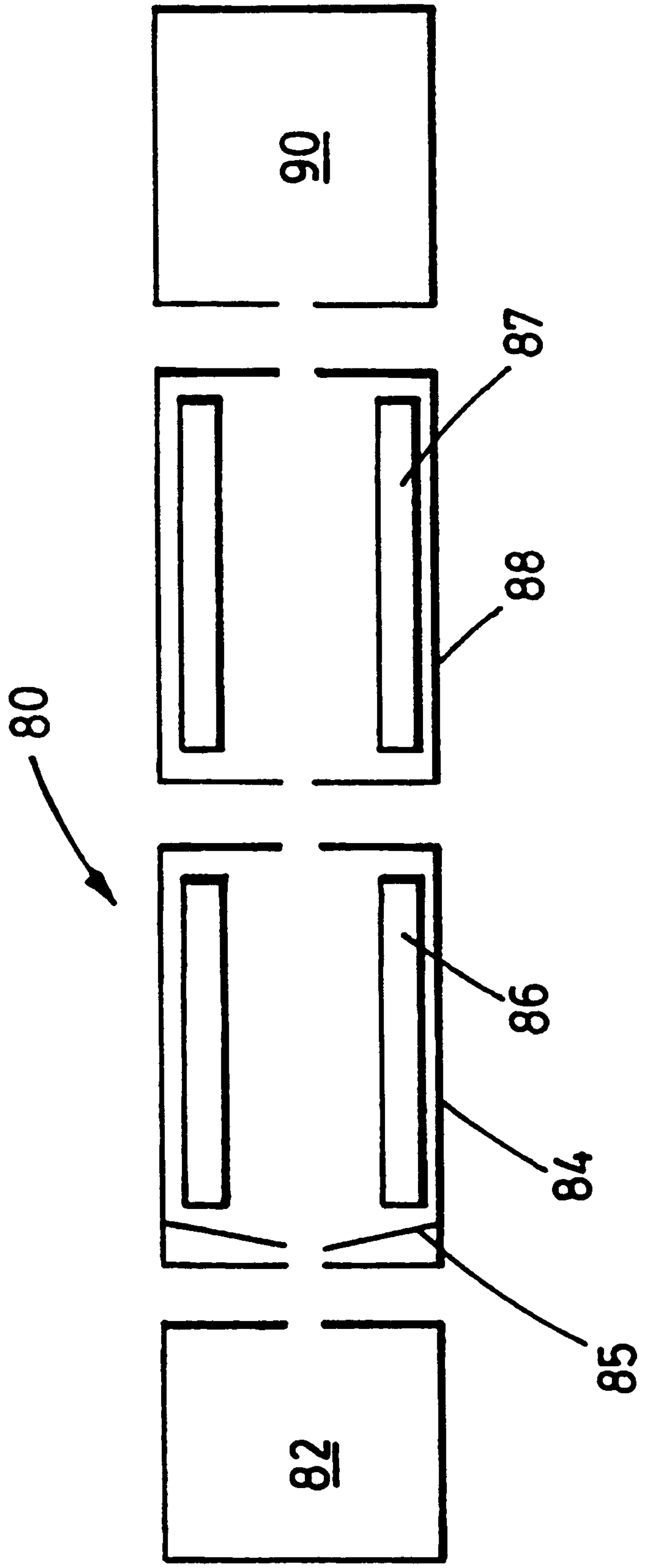
FIG. 2 shows schematically a second embodiment of an apparatus in accordance with the present invention.

Reference will now be made to FIG. 2, which shows an alternative or second embodiment of an apparatus in accordance with the present invention, generally indicated by the reference 80. This apparatus 80 has an ion source 82, and a first mass analyzer or quadrupole 84. In known manner, this includes an entrance skimmer plate 85 and a quadrupole rod set 86. This would be operated at a pressure as low as in a conventional quadrupole mass filter. Pressure here could vary from $10^{-4}$ Torr down to a higher vacuum. It will depend on the operating parameters, mainly dimensions, and would operate purely to select ions with an m/z of desired interest. These ions would then be passed into second quadrupole, generally indicated by the reference 88, with a rod set 89. Then, like the quadrupole set or guide 32 of the first embodiment, this would be operated at an elevated pressure of, for example, $10^{-4}$ Torr to 1 Torr, but again this will depend on the operating parameters, mainly dimensions. A signal in accordance with one of the equations above would be applied, to effect excitation of a desired ion, fragmentation etc. The fragmented ions would then be passed through to a final mass analyzer 90, which could be any suitable analyzer such as a quadrupole or time of flight mass spectrometer.

The advantage of this second embodiment is that, to give greater selectivity, certain ions can, effectively, be filtered out in the first mass analyzer 84. Then, just desired ions are excited in the second quadrupole 88. It will be recognized that the selectivity of the technique of the present invention is not perfect, and this second technique can ensure prior removal of ions that could cause interference with or degradation of a signal.

It will also be appreciated that the present invention can be applied in order to extend standard triple quad or quadrupole time of flight (Q-TOF or QqTOF) instruments to MS-MS-MS or even $MS^n$ instruments. For MS-MS-MS, this means selecting a parent ion in Q1 (the first MS selection) in the normal way, accelerating and introducing the ions into the buffer gas Q2 at energies of tens of eV, using the described invention to selectively excite one of the fragments in Q2, and analyzing the resulting spectrum in Q3 (or in the last MS, which could be a TOF). The subtraction methods above could be used to separate the "fragments of the fragment" from the fragments of the original parent. In any case, his can be termed MS-MS, since it provides a fragment spectrum of a fragment. MS-MS-MS-MS would carry this idea further, and provide two excitations, one tuned to fragment of the fragment, and the other to a "fragment of the fragment of the fragment" etc. Subtraction methods (i.e. excitation on/off methods) would be used to deconvolute or analyze, as detailed above. In effect, the present invention enables a number of steps to be carried out in a single stage, which, in a conventional instrument, would require two or more MS stages. This avoids the problems of multiple stages and loss of sample between stages.

It will be appreciated that various modifications are possible within the scope and spirit of the present invention. Thus, while the above equations suggest a single additional frequency applied to the base excitation frequency, it is possible that several additional frequencies could be used for excitation. This would enable a number of different ions to be excited simultaneously. The additional frequencies could be used either to excite additional parent ions, or to excite fragment ions that it is known will be generated by the excitation caused by the first frequency applied. In other words, the first frequency can be selected to cause excitation of a desired ion. Knowing that this will generate certain fragments, for example, fragments 72, 73 or 74 in FIG. 4*a*, a second additional frequency can simultaneously be applied, selected for fragments 74, for example. This in turn will then give secondary fragments. It will be appreciated that this compounding effect can be applied as many times as desired, so that, in effect, one can have $(MS)^n$ carried out in a single collisional quadrupole. Again, this can lead to high efficiencies, since inevitably transfer of ions from one quadrupole to another leads to loss of ions and loss of signal.

What is claimed is:

1. A method of analyzing a substance, the method comprising the step s of:

(1) ionizing the substance to generate a stream of ions;

(2) supplying the stream of ions to a quadrupole ion guide;

(3) providing a buffer gas in the ion guide;

(4) applying a radio frequency field by the quadrupole ion guide to maintain desired ions in a stable trajectory through the ion guide;

(5) in addition to the radio frequency field applied in step (4), applying a periodic change to the ion guide to cause resonance excitation of ions having a selected m/z ratio whereby the selected ions acquire increased kinetic energies resulting in enhanced collision-induced dissociation with the buffer gas;

(6) applying at least one additional excitation field in the quadrupole which additional excitation field is selected to cause resonance excitation of one of an addition ally selected parent ion and a fragment ion; and (7) analyzing the ion spectrum after fragmentation.

2. A method as claimed in claim 1, which comprises subjecting the selected ions in step (5) and each of the additionally selected parent ion and the fragment ion of step (6) to resonance excitation by one of: application of an additional field in the quadrupole; amplitude modulation of the radio frequency field applied by the quadrupole; frequency modulation of the radio frequency field applied by the quadrupole; and periodic variation in the quadrupole radius, the resonance excitation being at a frequency different from the frequency of the radio frequency field.

3. A method as claimed in claim 2, which includes selecting the resonance excitation to be at the fundamental frequency of the ion of interest.

4. A method as claimed in claim 3, which comprises applying the additional excitation by one of a field generated by the quadrupole ion guide and a field generated by additional electrodes.

5. A method as claimed in claim 1, wherein the method comprises passing the stream of ions through a mass analyzer to select a parent ion and supplying the parent ions in step (2) as said stream of ions to the quadrupole ion guide with sufficient energy to cause fragmentation of the parent ions to generate primary fragment ions, wherein step (5) comprises causing resonance excitation of the primary fragment ions to cause collision-induced dissociation of the primary fragment ions with the buffer gas to generate secondary fragment ions, and wherein step (6) comprises causing resonance excitation of one of the primary fragment ions and the secondary fragment ions.

6. A method as claimed in claim 5, when carried out in a triple quadrupole mass spectrometer comprising first, second and third quadrupole sections, wherein the step of selecting the parent ions is effected in the first quadrupole section, steps (5) and (6) are effected in the second quadruple section and step (7) is effected in the third quadrupole section.

7. A method as claimed in claim 5, when effected in a mass spectrometer comprising first and second quadrupole sections and a time-of-flight section, wherein the step of selecting the parent ion is effected in the first quadruple section, steps (5) and (6) are effected in the second quadruple section and step (7) is effected in the time-of-flight section.

8. A method of analyzing a substance, the method comprising the steps of:

(1) ionizing the substance to generate a stream of ions;

(2) passing the stream of ions through a mass analyzer to select a parent ion;

(3) providing a quadruple ion guide and a buffer gas in the ion guide;

(4) applying a radio frequency field by the quadrupole ion guide to maintain desired ions in a stable trajectory through the ion guide;

(5) supplying the parent ions selected in the mass analyzer to the quadrupole ion guide with sufficient energy to cause collision-induced dissociation with the buffer gas and generation of primary fragment ions;

(6) in addition to the radio frequency field applied in step (4), applying a periodic change to the ion guide to cause resonance excitation of primary fragment ions having a selected m/z ratio whereby the selected primary fragment ions require increased kinetic energies resulting in enhanced collision-induced dissociation with the buffer gas to generate secondary fragment ions; and (7) analyzing the ion spectrum after fragmentation.

9. A method as claimed in claim 8, which comprises subjecting the selected parent ions in step (5) and the primary fragment ion of step (6) to resonance excitation by one of: application of an additional field in the quadrupole; amplitude modulation of the radio frequency field applied by the quadrupole; frequency modulation of the radio frequency field applied by the quadrupole; and periodic variation in the quadrupole radius, the resonance excitation being at a frequency different from the frequency of the radio frequency field.

10. A method as claimed in claim 9, which includes selecting the resonance excitation to be at the fundamental frequency of the ion of interest.

11. A method as claimed in claim 8, 9 or 10, when carried out in a triple quadrupole mass spectrometer comprising first, second and third quadrupole sections, wherein step (2) is carried out in the first quadrupole section, steps (5) and (6) are carried out in the second quadrupole section, and step (7) is carried out in a third quadrupole section.

12. A method as claimed in claim 8, 9 or 10, when carried out using a mass spectrometer comprising first and second quadrupole sections and a time-of-flight section, wherein step (2) is carried out in the first quadrupole section, steps (5) and (6) are carried out in the second quadrupole section, and step (7) is carried out in the time-of-flight section.

13. An apparatus, for analyzing a substance by resonance excitation of selected ions and selective collision-induced dissociation, the apparatus comprising:

an ion source for generating a stream of ions;

a first quadrupole ion guide, for receiving the stream of ions and mass selecting a parent ion;

a second quadrupole ion guide, for receiving the stream of parent ions and provided with a buffer gas, for collision-induced dissociation between the parent ions and the buffer gas to generate primary fragment ions;

means for generating a radio frequency signal in the second quadrupole ion guide, for guiding ions through the second quadrupole ion guide, said generating means being connected to the second quadrupole ion guide;

means for generating an excitation signal connected to the second quadrupole ion guide for causing resonance excitation of at least one the parent ions and the primary fragment ions, thereby causing collision-induced dissociation between the parent ions and the buffer gas, generating respectively primary fragment ions from the parent ions and secondary fragment ions from the primary fragment ions; and a final mass analyzer connected to the second quadrupole ion guide, for receiving parent and fragment ions and for analyzing the ion spectrum.

14. An apparatus as claimed in claim 13, wherein the means for generating the excitation signal comprises one of: means for generating an additional signal for addition to the radio frequency signal; means for providing amplitude modulation of the radio frequency signal; and means for providing frequency modulation of the radio frequency signal.

15. An apparatus as claimed in claim 14, wherein the means for generating the excitation signal is adapted to generate two different signals for exciting two different ions.

16. An apparatus as claimed in claim 13, 14 or 15, wherein the final mass analyzer comprises a time-of-flight mass analyzer.

17. An apparatus as claimed in claim 13, 14 or 15, wherein the final mass analyzer comprises a quadrupole mass analyzer and a detector.

18. An apparatus, for analyzing a substance by resonance excitation of selected ions and selective collision-induced dissociation, the apparatus comprising:

an ion source for generating a stream of ions;

a quadrupole ion guide for receiving the stream of parent ions and provided with the buffer gas, for collision-induced dissociation between the ions and the buffer gas, to generate fragment ions;

means for generating a radio frequency signal in the quadrupole ion guide, for guiding ions through the quadrupole ion guide, said generating means being connected to the quadrupole ion guide;

means for generating an excitation signal connected to the quadrupole ion guide for causing resonance excitation of at least two different ions at two different frequencies, thereby causing enhanced collision-enhanced dissociation between the selected ions and the buffer gas, generating fragment ions; and a final mass analyzer connected to the quadrupole ion guide, for receiving ions and for analyzing the ion spectrum.

19. An apparatus as claimed in claim 18, which includes a triple quadrupole mass spectrometer comprising first, second and third quadrupole sections and a detector, wherein the ion source is connected to the first quadrupole section, for selection of parent ions in the first quadrupole section, wherein the second quadrupole section comprises said quadrupole ion guide, for receiving selected parent ions from the first quadrupole section, and wherein the third quadrupole section and the detector provides said final mass analyzer.

20. An apparatus as claimed in claim 18, which includes a mass spectrometer including first and second quadrupole sections and a time-of-flight section, where the ion source is connected to the first quadrupole section, for selection of a parent ion, the second quadrupole section provides said quadrupole ion guide and receives the parent ions selected in the first quadrupole section, and wherein the time-of-flight section provides said final mass analyzer.

21. An apparatus as claimed in any one of claims 18 to 20, wherein said means for generating an excitation signal comprises one of: means for generating an additional signal for addition to the radio frequency signal; means for providing amplitude modulation of the radio frequency signal; and means for providing frequency modulation of the radio frequency signal.

22. An apparatus as claimed in claim 13 or 18, wherein the ion source comprises an electrospray ionization source.

* * * * *